US012693883B2

(12) United States Patent
Tirat

(10) Patent No.: US 12,693,883 B2
(45) Date of Patent: Jul. 28, 2026

(54) METHOD FOR CONTROLLING A DISTRIBUTED COMPUTER SYSTEM AND ASSOCIATED DEVICES

(71) Applicant: BYO Networks, Palaiseau (FR)

(72) Inventor: Olivier Tirat, Orsay (FR)

(73) Assignee: BYO Networks, Palaiseau (FR)

( * ) Notice: Subject to any disclaimer, the term of this patent is extended or adjusted under 35 U.S.C. 154(b) by 722 days.

(21) Appl. No.: 17/926,222

(22) PCT Filed: May 18, 2021

(86) PCT No.: PCT/EP2021/063111
§ 371 (c)(1),
(2) Date: Nov. 26, 2022

(87) PCT Pub. No.: WO2021/233897
PCT Pub. Date: Nov. 25, 2021

(65) Prior Publication Data
US 2023/0185596 A1 Jun. 15, 2023

(30) Foreign Application Priority Data
May 20, 2020 (FR) ...................................... 2005149

(51) Int. Cl.
*G06F 9/455* (2018.01)
*H04L 41/08* (2022.01)
(52) U.S. Cl.
CPC .......... *G06F 9/45558* (2013.01); *H04L 41/08* (2013.01); *G06F 2009/4557* (2013.01); *G06F 2009/45587* (2013.01)

(58) Field of Classification Search
CPC .. G06F 9/45558; G06F 9/4856; G06F 9/5088; G06F 21/53; G06F 2009/4557;
(Continued)

(56) References Cited

U.S. PATENT DOCUMENTS

2012/0278802 A1 11/2012 Nilakantan et al.
2014/0101656 A1* 4/2014 Zhu ..................... H04L 63/0227
718/1
(Continued)

OTHER PUBLICATIONS

Scott's Weblog, "Introducing Linux Network Namespaces", Sep. 4, 2013, 6 pages.
(Continued)

*Primary Examiner* — Lewis A Bullock, Jr.
*Assistant Examiner* — John Robert Dakita Ewald
(74) *Attorney, Agent, or Firm* — Soquel Group LLC

(57) ABSTRACT
A method for controlling a distributed computer system, the distributed computer system including at least one virtual machine and a set of network elements, the set of network elements forming a first environment of the virtual machine, the control method being implemented by the virtual machine and including, upon initiating the virtual machine, instantiating a second environment formed by a set of virtual network elements, the second environment being different from the first environment, transferring at least one network element from the first environment to the second environment, activating the at least one transferred network element, instantiating at least one link between the first environment and each network element of the second environment, and initiating the at least one instantiated link.

8 Claims, 3 Drawing Sheets

(58) Field of Classification Search
CPC .. H04L 41/0895; H04L 41/122; H04L 41/342
See application file for complete search history.

(56) References Cited

U.S. PATENT DOCUMENTS

| | | | |
|---|---|---|---|
| 2014/0123135 A1* | 5/2014 | Huang | ................ H04L 41/5054 |
| | | | 718/1 |
| 2015/0222480 A1 | 8/2015 | Gan et al. | |
| 2018/0074839 A1 | 3/2018 | Pachlore et al. | |
| 2020/0396102 A1* | 12/2020 | Röglinger | ............. H04L 63/102 |
| 2022/0107895 A1* | 4/2022 | Holmberg | ............... H04L 67/10 |

OTHER PUBLICATIONS

Kashyap Thimmaraju. Saad Hermak. Gabor Retv Ari. Stefan Schmid. "MTS : Bringing Multi-Tenancy to Virtual Networking" Jul. 10, 2019 (Jul. 10, 2019). pp. 549-564. USENIX. The Advanced Computing Systems Association. Retrieved from the Internet: https ://www.usenix.org/si tes/ default/files/ate 19 _full_proceedings_ interior.pdf.

Ryota Kawashima. "vNFC: A Virtual Networking Function Container for SDN-Enabled Virtual Networks" Network Cloud Computing and Applications (NCCA), 2012 Second Symposium On, IEEE, Dec. 3, 2012 (Dec. 3, 2012), pp. 124-129.

International Search Report, PCT /EP2021/063111, 3 pages, Jun. 7, 2021.

* cited by examiner

<u>FIG.1</u>

METHOD FOR CONTROLLING A DISTRIBUTED COMPUTER SYSTEM AND ASSOCIATED DEVICES

The present invention relates to a method of controlling a distributed computer system. The present invention further relates to a virtual machine, a distributed computer system, a computer program product and a readable medium of information involved in the control method.

The present invention relates to the field of cloud computing or distributed computing which refers to access to computer services (servers, storage, networking, software) via the Internet (the "cloud") via an operator providing a specific network infrastructure.

In the case of a public network (also referred to as a "public cloud") or a mixed public and private network, an end user (e.g. a company) uses the operator's infrastructure to run virtual machines.

In computing, a virtual machine (often referred to as VM) is an illusion to a computing device created by an emulator software or instantiated on a hypervisor. The emulator software simulates the presence of hardware and software resources such as memory, processor, hard disk, even operating system and drivers, allowing programs to be executed under the same conditions as the conditions of the simulated machine.

More specifically, such a network infrastructure allows the virtual machine user to access programs, data, or services that the virtual machines produce.

The network infrastructure is also in charge of the initial configuration of virtual machines during the initial instantiation phase of virtual machines. Such an instantiation implies the execution of programs provided by the operator so as to adapt the virtual machine to the infrastructure and the configuration of the infrastructure network for creating the virtual machine.

For this reason, to migrate a virtual machine from one infrastructure of a first operator to another infrastructure of a second operator, it is necessary to reconstruct all the interactions the virtual machine has with the infrastructure of the first operator to switch to the infrastructure of the second operator. This involves the intervention of the virtual machine user and two operators, so the portability of the virtual machine is low.

There is thus a need for a method of controlling a distributed computer system which would a provide better portability of a virtual machine while maintaining a good level of security for all the elements belonging to the distributed computer system.

To this end, the present description proposes a method of controlling a distributed computer system, the distributed computer system comprising at least one virtual machine and a set of network elements, the set of network elements forming a first environment of the virtual machine, the control method being implemented by the virtual machine and comprising, during a initiation of the virtual machine, the steps of instantiating a second environment consisting of a set of virtual network elements, the second environment being different from the first environment, of transferring at least one network element from the first environment to the second environment, of activating the at least one transferred network element, instantiating at least one link between the first environment and each network element of the second environment, and of initiating the at least one instantiated link.

According to particular embodiments, the control method comprises one or a plurality of the following features, when technically possible:

each network element is chosen from the list consisting of a switch, a router and a firewall.

the step of instantiating at least one link involves the use of a network bridge or of a router.

the step of instantiating a second environment is implemented by using a container.

the control of the distributed computer system corresponds to a maximum right of access, the second environment being controllable by a right of access strictly lower than the maximum right of access.

the activation and instantiation steps of the at least one link are implemented with a right of access strictly lower than the maximum right of access to the virtual machine.

The present description further describes a virtual machine suitable for implementing a method of controlling a distributed computer system, the distributed computer system comprising at least the virtual machine and a set of network elements, the set of network elements forming a first environment of the virtual machine, the virtual machine being suitable, during the initiation of the virtual machine, for instantiating a second environment consisting of a set of virtual network elements, the second environment being different from the first environment, for transferring at least one network element of the first environment to the second environment, for activating the at least one transferred network element, for instantiating the at least one link between the first environment and each network element of the second environment, and for initiating the at least one instantiated link.

The present description further relates to a distributed computer system comprising at least one virtual machine as described above.

The present description further describes a computer program product comprising a readable storage medium, on which is stored a computer program comprising program instructions, the computer program being loadable on a data processing unit and implementing a method of controlling a distributed computer system as described above when the computer program is implemented on the data processing unit.

The present description further relates to a readable storage medium comprising program instructions forming a computer program, the computer program being loadable on a data processing unit and implementing a method of controlling a distributed computer system as described above when the computer program is implemented on the data processing unit.

Other features and advantages of the invention will appear upon reading hereinafter the description of the embodiments of the invention, given only as an example, and making reference to the following drawings.

Figure 1:
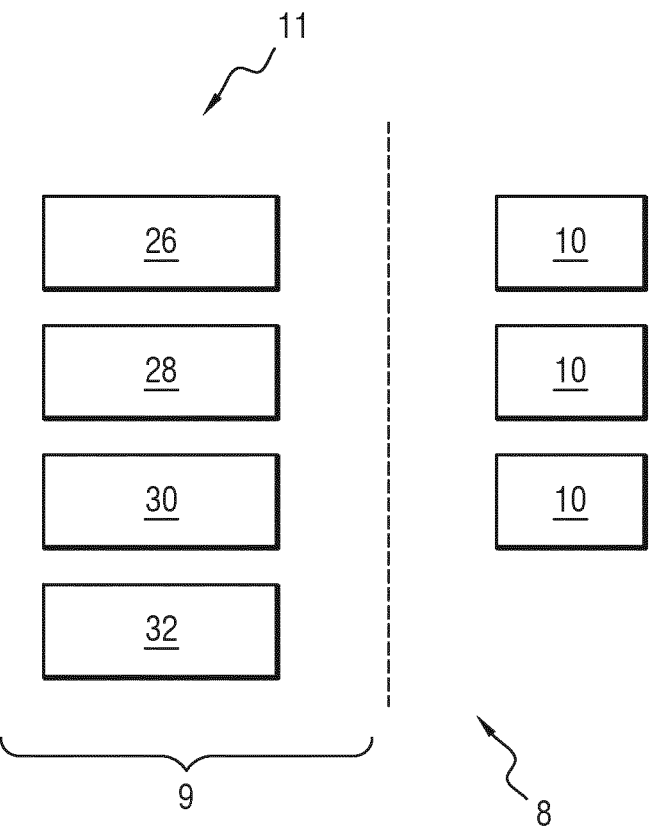
FIG. 1 is a schematic representation of a distributed computer system.

A distributed computer system 8 is illustrated schematically in FIG. 1.

The distributed computer system 8 is an infrastructure 9 controlled by an operator connected to the terminals 10 (computers here). Such an operator is often referred to as a cloud operator. To avoid confusion hereinafter in the description, the cloud operator denomination is used for naming the operator.

It should be noted that "control" refers to the control of at least a part of the elements of the distributed computer system 8 (either on the terminal side or on the infrastructure 9 side).

In the example described, the control of the distributed computer system 8 corresponds to a maximum right of access to the infrastructure 9, which is only assigned to the cloud operator.

The term "maximum" measures the extent of the assigned control.

The control of the infrastructure 9 is e.g. performed by a set of software called orchestrator or VIM. The acronym VIM stands for "Virtual Infrastructure Manager" which literally means virtual infrastructure controller.

More precisely, the distributed computer system 8 includes, on the terminal side, computers 10 suitable for emulating a virtual machine VM and, on the infrastructure 9 side, a set of network elements 11.

Figure 2:
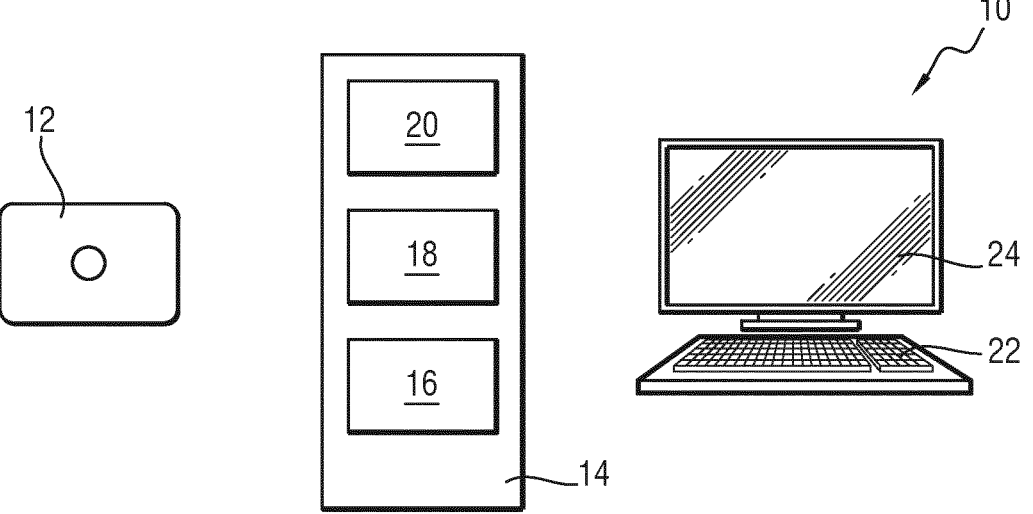
FIG. 2 is a schematic representation of part of such a distributed computer system.
Figure 3:
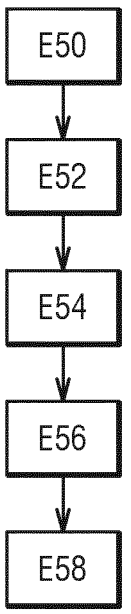
FIG. 3 is a flowchart of an example of implementation of a method for controlling the distributed computer system shown in FIG. 1.

A computer 10 is illustrated more specifically in FIG. 2 with a computer program product 12. The interaction of the computer program product 12 with the computer 10 makes it possible to implement a virtual machine (VM) which is as such suitable for implementing the control of the distributed computer system 8. The control method is thus a method implemented by a computer.

More generally, the computer 10 is an electronic computer suitable for manipulating and/or transforming data represented as electronic or physical quantities in computer registers and/or memories into other similar data corresponding to physical data in memories, registers or other types of display, transmission or storage.

It should be noted that, in the present description, the expression "suitable for" equally means well "apt to" or "configured for".

The computer 10 includes a processor 14 comprising a data processing unit 16, memories 18 and a data medium drive 20. According to the example shown, the computer 10 comprises a keyboard 22 and a display unit 24.

The computer program product 12 includes a readable storage medium.

A readable storage medium is a medium readable by the computer 10, usually by the drive 20. The readable storage medium is a medium suitable for storing electronic instructions and apt to be coupled to a bus of a computer system.

As an example, the readable storage medium is a diskette or a floppy disk, an optical disk, a CD-ROM, a magneto-optical disk, a ROM, a RAM, an EPROM, an EEPROM, a magnetic card or an optical card.

By extension to virtualized environments, any software which identically reproduces the behaviors of the readable storage media listed above is also a readable storage medium.

The computer program comprising program instructions is stored on any of the aforementioned readable storage media.

The computer program can be loaded onto the data processing unit 16 and is suitable for generating the development of the virtual machine (VM).

The virtual machine (VM) is intended for providing a computer interface to a user. In the example proposed, the user of the VM is not the operator.

Thus, in a secure operation, the user does not have a maximum right of access (which is, on the contrary, only assigned to the cloud operator) to the infrastructure but has the maximum right of access for the virtual machine (VM) (for which the cloud operator should not have the maximum right of access).

In addition to the services provided to the user, the virtual machine (VM) is suitable for implementing a method of controlling the distributed computer system 8.

The set of network elements 11 consists of network elements.

By definition, a network element is a component which belongs to a network.

According to the example shown, the set of network elements 11 includes a switch 26, a router 28, a firewall 30 and a network interface 32, e.g. a port.

In the general case, the distributed computer system 8 includes more network elements, said network elements being an element chosen from the list consisting of a switch, a router or a firewall.

Furthermore, depending on the case, each of the aforementioned elements (switch 26, router 28, firewall 30 and network interface 32)) is either a physical or a virtual element.

The set of network elements 11 forms a first environment E1 of the virtual machine 15 (VM).

Such a first E1 environment of the virtual machine (VM) can be seen as the starting network environment of the virtual machine (VM).

The operation of the virtual machine (VM) is now described with reference to an example of implementation of a method for controlling the distributed computer system 8.

According to the example described, the control method is implemented during the initiation of the virtual machine (VM).

The control method is e.g. implemented when instantiating the virtual machine (VM).

As an illustration, the control method is implemented after the virtual machine (VM) initiation process, but before the initialization of the virtual machine (VM).

In a variant, the control method is implemented during the initialization of the virtual machine (VM).

Moreover, with respect to the elements of the environment, the control method is implemented after the initiation of the file management system of the virtual machine (VM) but before the start process of the elements of the first E1 environment of the virtual machine (VM).

Such a control method can thus be seen as a computer process.

A process is a program being executed by a computer.

The control method includes a first instantiation step E50, a transfer step E52, an activation step E54, a second instantiation step E56 and a start step E58.

During the first instantiation step E50, a second environment E2 is instantiated.

The second E2 environment consists of a set of virtual network elements.

The first instantiation step E50 aims at obtaining a second environment E2 isolated from the first environment E1.

The second environment E2 is thus different from the first environment E1.

Virtual network elements are not visible from the first E1 environment and cannot be accessed.

According to the example illustrated, the second environment E2 can be controlled by a right of access strictly lower than the maximum right of access for the virtual machine (VM).

The right of access of the cloud operator on the second environment E2 are the highest-level rights on said environment and are necessary for the instantiation of the network elements of the environment E2 of the virtual machine (VM).

The right of access is then the right of access which was imparted to the virtual machine (VM) by the cloud operator.

Such a second E2 environment is often instantiated in the form of a net namespace. In computer science, the term namespace refers to an abstract place designed for hosting elements the scope or accessibility of which is reduced to a group of players determined or identified by the name of the namespace.

According to the example illustrated, the first instantiation step E50 of the second environment E2 is implemented by using a container.

In computing, a container is a data structure, a class, or an abstract type of data, the instances of which represent collections of other objects. In other words, containers are used to store objects in an organized form which follows specific access rules.

When a container is executed, a network environment dedicated to the container execution space, is created. By construction, such a network environment is an environment isolated from the first environment E1. The network environment of the container is thus an example of a second environment E2.

It should be noted that any other technology making possible the isolation of network environments within the same virtual machine can be used during the first instantiation step E50.

During the transfer step E52, at least one network element of the first environment E1 is transferred to the second environment E2.

Preferentially, as is the case for the present example, each network element of the first environment E1 is transferred to the second environment E2.

In a particular embodiment, all the network elements provided by the cloud operator are network interfaces 32.

To make the discussion clearer, the following developments are based on the assumption that the transfer takes place for all network elements, the transposition to the case of the transfer of fewer network elements being immediate.

The network elements provided by the cloud operator thus become invisible to the first environment E1.

A practical example of implementing a transfer to a second environment E2 is now presented in detail.

In the Linux environment e.g., all network features are implemented in environments called "net namespace", often abbreviated as "netns".

When a virtual machine is initialized, all of such network features are implemented in the netns environment associated with the init process. By definition, the init process has the highest-level rights and can do everything on the machine (including starting the initialization processes of the network elements and of the virtual machine). Hereinafter, the netns environment associated with the init method is called "default".

In the case of a container, a netns environment is created for the implementation of network function(s) of the netns environment. Such netns environment is associated with all the processes of the container (in fact with the init process of the container).

Thereafter, the netns environment associated with the container is called "container".

In the case of an eth0 network interface initially created in the netns "default", the transfer step is implemented by logically transferring the interface into the nets "container". The following command:

ip link set dev eth0 netns container executed with the highest-level rights in an environment with right of access to the netns default, will allow the interface to be transferred.

Once said command is executed, the eth0 interface is no longer visible in the netns "default". The eth0 interface becomes visible and usable in the netns "container" wherein same was transferred.

The eth0 interface of a first environment was successfully transferred to a second environment.

During the activation step E54, at least one transferred network element is activated.

During the activation step E54 e.g., each network element transferred into the second environment E2 is initiated (or reinitiated). In other words, in the second environment E2, each network element transferred from the first environment E1 is initiated.

In the particular embodiment wherein all the network elements are network interfaces 32, the network interfaces 32 are activated in the second environment E2.

Advantageously, such an activation step E54 is not implemented by having the highest-level right of access on the virtual machine (VM), but with lower level right of access.

It is then possible to implement the processes of the cloud operator which would have taken place in the first environment E1 during an initiation without the highest-level right of access of the virtual machine (VM) by implementing the present control method.

Auto-configuration devices or specific executables are examples of such cloud operator processors.

Such cloud operator processes can thus only act on the second environment E2. The first environment E1 remains isolated from the potentially dangerous implementation of such processes.

In a variant or in addition, data retrieval processes can be implemented for improving the implementation of the subsequent steps of the control method.

Data retrieval processes include retrieval processes for IP addresses and routing rules exchanged by processes using a DHCP. Automatic configuration tools such as "cloud-init" for the configuration of virtual machines (VMs) at initiation, but also mass configuration tools as based on execution across the network of data exchange or configuration software. Such software include, amongst others, Ansible®, Puppet® or SaltStack®.

According to another example, key exchange methods are used for the instantiation of an encrypted tunnel as well as methods for the instantiation of said tunnel for the encryption of all the streams visible to the cloud operator.

Each of the aforementioned processes is, according to another embodiment, implemented by a container not having the highest-level right of access on the virtual machine (VM).

During the second instantiation step E56, at least one link between the first environment E1 and at least one network element of the second environment E2 is instantiated.

Such a second instantiation step E56 can thus be considered as a connection step.

Such a link makes it possible to connect the virtual machine (VM) to a part of the distributed computer system 8 by means of processes which can be controlled only by an entity having a right of access strictly lower than the highest-level right on the virtual machine (VM). Thus, in the example described, the link is not controlled by the cloud operator.

The virtual machine (VM) e.g. generates a virtual link in the first environment E1, said link being intended for being connected to the network elements of the second environment E2.

The link generated has two ends, one of which is then transferred to the second environment E2 in order to be connected to the network elements of the second environment E2 and the other to an interface instantiated by the virtual machine (VM) with the above-mentioned rights above and belonging to the first environment E1. All network devices in the E1 environment are then accessible only with the highest-level rights of the virtual machine (VM). The above means that all the network equipment in the environment E1 is inaccessible to the software implemented by the distributed system 8 being executed in the second environment E2.

Such a link thus acts as an interface between the distributed computer system 8 and the virtual machine (VM).

During the initiation step E58, at least the instantiated connection is initiated.

In addition, all network elements of the first E1 environment are initiated by the virtual machine VM with the highest-level right of access on the virtual machine (VM).

As an example, the start step E58 includes the configuration of the network functions implemented in the second environment E2 and then launching the software for running the network functions needed for the operation of either the real or the virtual network equipment of the second environment E2.

The initiation step E58 further includes the activation of the two ends of the at least one link connecting the first environment E1 to the second environment E2, the configuration of the network functions implemented in the first environment E1 and the launching of the software for running the network functions needed for the operation of the network functions of the virtual machine (VM).

The control method thus makes it possible, irrespective of the data transmitted during the initiation of the virtual machine (VM), and in particular during the initialization of the network elements provided by the cloud operator, that the user who has the highest-level right of access to the virtual machine (VM) keeps the control over the rights and data without ever providing the highest-level right of access to the cloud operator.

The control method thus makes it possible to dispense with constraints linked to the cloud operator guaranteeing a certain independence to the user of the virtual machine (VM) with respect to the infrastructure 9.

Thus, the control method provides a better portability of a virtual machine VM while maintaining a good level of security of all the elements belonging to the distributed computer system 8.

Other embodiments are conceivable for the control method which has just been described, and such embodiments can be combined with the control method when the embodiments are technically compatible with such a method.

Thus, during the initiation step E58, other network elements other than the transferred network elements can also be instantiated. The software needed for the instantiation of the network elements is executed with lower rights than the maximum right of access to the virtual machine (VM).

Such network elements are often suitable for implementing more complex network functions. Such more complex network functions can include, inter alia, the implementation of encrypted tunnels providing identical services to a network interface 32.

In a particular embodiment, the implementation of one or a plurality of virtual switches implemented in the second environment E2, the implementation of one or a plurality of virtual routers and the implementation of software for setting up routing tables, in particular same based on automatic routing protocols such as BGP or OSPF. The acronym BGP refers to "Border Gateway Protocol" and the acronym OSPF refers to "Open Shortest Path First".

According to another embodiment or in addition, the initiation step E58 comprises the instantiation of the network elements for running such complex functions and in particular the instantiation of all the network equipment, tunnels, interfaces for running the complex functions requested in the second environment E2, as well as the instantiation of the links between all such network equipment in the second environment E2.

According to one embodiment for the initiation step E58, at least one network bridge is used. A network bridge performs a level 2 switching function according to the OSI model. The OSI model (acronym referring to "Open Systems Interconnection") is a standard of communication, in a network, for all computer systems.

In each of the cases proposed, the instantiation of the network equipment needed for running such complex functions is not implemented by having the highest-level right of access to the virtual machine (VM) but with a lower-level right of access.

In a particular embodiment, a container having lower-level right of access is used.

According to another embodiment of the start step E58, at least one router is used. A router performs a level 3 switching function according to the OSI model.

According to yet another embodiment, when additional data were obtained during the activation step E54, the link is preferentially made using the router and software providing dedicated functions.

A dedicated function is e.g. a service for configuring the IP addresses by means of a DHCP. The acronym DHCP refers to "Dynamic Host Configuration Protocol" and refers to a network protocol the role of which is to ensure the automatic configuration of the IP parameters of a station or of a machine, in particular by automatically assigning an IP address and subnet mask to same.

In a variant, a dedicated function is a name resolution service or a server for configuring the virtual machine VM.

Preferentially, the software providing the dedicated functions is not implemented with higher-level right of access on the virtual machine (VM) but with lower-level right of access.

Moreover, it should be noted that other embodiments are obtained by implementing the aforementioned steps in a manner different from the control method which has been described as an example.

Thus, the activation step E54 is by nature independent of the preceding steps and is thus not in a constrained sequencing with regard to the other steps of the method.

The activation step E54 has a particular advantage to be implemented after the transfer step E52 insofar as same ensures that the software needed for implementing the link with the distributed system are all executed with rights strictly lower than the maximum right of the VM.

The activation step E54 further has a particular advantage to be implemented before the start step E58 because the activation step E54 can produce the date needed for the start step E58.

The activation step E54 is not dependent on the implementation of the second instantiation step E56 which can occur before or after the implementation of the activation step E54.

According to another example, the second instantiation step E56 can be implemented at any time after the creation of the second environment E2 of the first instantiation step E50 and allows the expected functions to be performed only once the initiation step E58 has been completed.

The invention claimed is:

1. A method of controlling a distributed computer system, the distributed computer system comprising at least one virtual machine and a set of network elements, the set of network elements forming a first environment of the virtual machine, the control method being implemented by the virtual machine and comprising, during an initiation of the virtual machine:

instantiating a second environment formed by a set of virtual network elements, the second environment being different from the first environment;

transferring at least one network element from the first environment to the second environment;

activating the at least one transferred network element;

instantiating at least one link between the first environment and each network element of the second environment, comprising:

generating a link intended for being connected to the network elements of the second environment, the link comprising two ends;

transferring one end of the link to the second environment in order to be connected to the network elements of the second environment; and transferring the other end of the link to an interface belonging to the first environment, the interface being instantiated by the virtual machine with the highest-level of right of access to the virtual machine; and initiating the at least one instantiated link, wherein said activating and said instantiating at least one link are carried out with a level of right of access strictly inferior to the highest-level of right of access to the virtual machine.

2. The control method according to claim 1, wherein each network element is selected from a list consisting of a switch, a router and a firewall.

3. The control method according to claim 1, wherein said instantiating at least one link comprises using a network bridge or router.

4. The control method according to claim 1, wherein said instantiating a second environment is performed using a container.

5. The control method according to claim 1, wherein control of the distributed computer system corresponds to a maximum right of access, the second environment being controllable by a right of access strictly lower than the maximum right of access.

6. A non-transient computer-readable medium storing instructions which, when implemented by a data processing unit, cause the data processing unit to implement a method of controlling a distributed computer system according to claim 1.

7. A computer processor implementing a virtual machine that controls a distributed computer system, the distributed computer system comprising the VM and a set of network elements, the set of network elements forming a first environment virtual machine, the virtual machine performing, during an initiation of the virtual machine, a method comprising:

instantiating a second environment formed by a set of virtual network elements, the second environment being different from the first environment;

transferring at least one network element from the first environment to the second environment;

activating the at least one transferred network element;

instantiating at least one link between the first environment and each network element of the second environment, comprising:

generating a link intended for being connected to the network elements of the second environment, the link comprising two ends;

transferring one end of the link to the second environment in order to be connected to the network elements of the second environment; and transferring the other end of the link to an interface belonging to the first environment, the interface being instantiated by the virtual machine with the highest-level of right of access to the virtual machine; and initiating the at least one instantiated link, wherein the activating and the instantiating at least one link are carried out with a level of right of access strictly inferior to the highest-level of right of access to the virtual machine.

8. A distributed computer system comprising at least one VM according to claim 7.

* * * * *